United States Patent
Watanabe et al.

(10) Patent No.: US 11,002,995 B2
(45) Date of Patent: May 11, 2021

(54) PHASE MODULATOR, CONTROL METHOD FOR PHASE MODULATOR, AND FRINGE PROJECTOR APPARATUS

(71) Applicants: OLYMPUS CORPORATION, Hachioji (JP); NIPPON TELEGRAPH AND TELEPHONE CORPORATION, Tokyo (JP)

(72) Inventors: Daichi Watanabe, Tokyo (JP); Satomi Katayose, Tokyo (JP); Kei Watanabe, Tokyo (JP); Yu Kurata, Tokyo (JP); Ryoichi Kasahara, Tokyo (JP)

(73) Assignees: OLYMPUS CORPORATION, Tokyo (JP); NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 16/512,909

(22) Filed: Jul. 16, 2019

(65) Prior Publication Data

US 2019/0339549 A1 Nov. 7, 2019

Related U.S. Application Data

(63) Continuation of application No. PCT/JP2018/002210, filed on Jan. 25, 2018.

(30) Foreign Application Priority Data

Jan. 25, 2017 (JP) .............................. JP2017-011684

(51) Int. Cl.
*G02F 1/01* (2006.01)
*G02F 1/225* (2006.01)

(52) U.S. Cl.
CPC .......... *G02F 1/0147* (2013.01); *G02F 1/2257* (2013.01); *G02F 2203/21* (2013.01); *G02F 2203/50* (2013.01)

(58) Field of Classification Search
CPC .. G02F 1/0147; G02F 1/2257; G02F 2203/21; G02F 2203/50
(Continued)

(56) References Cited

U.S. PATENT DOCUMENTS 4,219,785 A 8/1980 Scifres et al.
7,440,643 B2 10/2008 Yamazaki
(Continued)

FOREIGN PATENT DOCUMENTS

JP 5526694 A 2/1980
JP 2005250320 A 9/2005
(Continued)

OTHER PUBLICATIONS

International Preliminary Report on Patentability (IPRP) dated Jul. 30, 2019 (and English translation thereof), issued in International Application No. PCT/JP2018/002210.
(Continued)

*Primary Examiner* — Jerry M Blevins
(74) *Attorney, Agent, or Firm* — Holtz, Holtz & Volek PC (57) ABSTRACT

A fringe projector apparatus includes: a phase modulator having a first waveguide, a second waveguide, and a plurality of heaters including a first heater and a second heater, wherein the first and second waveguides and the plurality of heaters are provided on a single substrate, and wherein the first heater heats the first waveguide and the second heater heats a position away from the first waveguide; a light source that generates a light beam to be input to the first waveguide and the second waveguide; and a controller that controls a phase difference between the first waveguide and the second waveguide by changing an electric power consumption of the first heater under a condition that a total electric power consumption of the plurality of heaters is constant.

9 Claims, 4 Drawing Sheets

(58) Field of Classification Search
USPC .............................................................. 385/1
See application file for complete search history.

(56) References Cited

U.S. PATENT DOCUMENTS

| | | | |
|---|---|---|---|
| 2003/0210845 A1 | 11/2003 | Shani et al. | |
| 2007/0230856 A1* | 10/2007 | Yamazaki | G02F 1/0147 385/5 |
| 2007/0292140 A1* | 12/2007 | Terayama | H04B 10/66 398/140 |

FOREIGN PATENT DOCUMENTS

| | | | | | |
|---|---|---|---|---|---|
| JP | 2007271704 A | | 10/2007 | | |
| JP | 2015132509 A | | 7/2015 | | |
| JP | 2016057341 A | | 4/2016 | | |
| JP | 2016142995 A | * | 8/2016 | ............. | G02F 1/015 |
| JP | 2016142995 A | | 8/2016 | | |
| JP | 2016187529 A | | 11/2016 | | |

OTHER PUBLICATIONS

International Search Report (ISR) dated Mar. 27, 2018 (and English translation thereof), issued in International Application No. PCT/JP2018/002210.

\* cited by examiner

PHASE MODULATOR, CONTROL METHOD FOR PHASE MODULATOR, AND FRINGE PROJECTOR APPARATUS

CROSS-REFERENCE TO RELATED APPLICATIONS

This application is based upon and claims the benefit of priority from the prior Japanese Patent Application No. 2017-011684, filed Jan. 25, 2017, the entire contents of which are incorporated herein by reference.

BACKGROUND

1. Field of the Invention

The present invention relates to a phase modulator, a control method for a phase modulator, and an fringe projector apparatus.

2. Description of the Related Art

As a method for measuring the three-dimensional shape of a measurement target, a so-called "fringe scanning method" is known. In this technique, a laser interference fringe is projected onto the measurement target, and an image of the projected interference fringe is captured and analyzed so as to calculate the surface peak and bottom information for the measurement target. With the fringe scanning method, the depth of the bottom and the height of the peak are calculated for each point based on the scanning amount of the interference fringe and the change in the light intensity for each point of the projected image. The scanning amount of the interference fringe is controlled by changing the phase difference between two or more light beams to be subjected to interference. For example, by changing the phase provided by one from among two branched optical waveguides using the electro-optical effect or the like, the scanning amount of the interference fringe to be projected can be controlled.

Furthermore, as a method for measuring the scattering characteristics of a measurement target, a so-called "structured illumination method" is known. In this method, multiple sinusoidal-pattern light beams having different phases are projected, and a specular reflection component, a primary scattering reflection component, and a multi-scattering reflection component, which are reflected from the measurement target, are separately imaged. With this technique, by employing structured illumination having a given pattern, different reflection light components can be separately acquired. Such multiple sinusoidal-pattern light beams are generated using a phase shift method in which the phase value of the pattern is changed.

In a case in which the phase of the optical waveguide is changed using the electro-optical effect, such an arrangement requires a special material such as lithium niobate. In contrast, in a case in which the thermo-optic effect is employed, such a phase modulator can be configured with only typical silica materials formed on a silicon substrate. However, in a case of temperature change of an optical waveguide on a silicon substrate, this arrangement has the potential to cause the occurrence of warpage of the substrate or the like due to the difference in the thermal expansion rate or the like between the substrate and the optical waveguide. In some cases, this leads to a change of the interference fringe projection position. In a case in which such a change of the interference fringe projection position occurs due to such causes other than the phase shifting of the optical waveguide, this leads to degradation of the measurement precision.

SUMMARY

The present invention has been made in view of such a situation. Accordingly, it is an exemplary purpose of an embodiment of the present invention to provide a phase modulator that is capable of suppressing deformation that can occur due to heating.

A phase modulator according to an embodiment of the present invention comprises: one or more waveguides provided on a substrate, and including at least a first waveguide; and a plurality of heaters provided on the substrate. The plurality of heaters includes a first heater that heats the first waveguide and a second heater that heats a position away from the first waveguide. The plurality of heaters is driven such that the total electric power consumption of the plurality heaters is constant.

Another embodiment of the present invention relates to a control method for a phase modulator. The phase modulator comprises: one or more waveguides provided on a substrate, and including at least a first waveguide; and a plurality of heaters provided on the substrate, and including a first heater that heats the first waveguide and a second heater that heats a position away from the first waveguide. The control method comprises controlling a phase provided by the first wave guide by changing an electric power consumption of the first heater under a condition that the total electric power consumption of the multiple heaters is constant.

Yet another embodiment of the present invention relates to a fringe projector apparatus. The fringe projector apparatus comprises: a phase modulator including a first waveguide, a second waveguide, and a plurality of heaters including a first heater and a second heater, wherein the first and second waveguides and the plurality of heaters are provided on a single substrate, and wherein the first heater heats the first waveguide and the second heater heats a position away from the first waveguide; a light source that generates a light beam to be input to the first waveguide and the second waveguide; and a control unit controls a phase difference between the first waveguide and the second waveguide by changing the electric power consumption of the first heater under a condition that the total electric power consumption of the multiple heaters is constant, so as to control an interference fringe projection pattern generated based on interference between light beams output from the first waveguide and the second waveguide.

It should be noted that any combination of the components described above or any manifestation thereof, may be mutually substituted between a method, apparatus, system, and so forth, which are also effective as an embodiment of the present invention.

BRIEF DESCRIPTION OF THE DRAWINGS

Embodiments will now be described, by way of example only, with reference to the accompanying drawings that are meant to be exemplary, not limiting, and wherein like elements are numbered alike in several figures, in which.

DETAILED DESCRIPTION

The invention will now be described by reference to the preferred embodiments. This does not intend to limit the scope of the present invention but to exemplify the invention.

First, description will be made regarding a summary of several embodiments according to the present invention.

A phase modulator according to an embodiment of the present invention comprises: one or more waveguides provided on a substrate, and including at least a first waveguide; and a plurality of heaters provided on the substrate. The plurality of heaters includes a first heater that heats the first waveguide and a second heater that heats a position away from the first waveguide. The plurality of heaters is driven such that the total electric power consumption of the multiple heaters is constant.

With this embodiment, the phase modulator is driven such that the electric power consumption of the plurality of heaters provided on the substrate is constant even if the electric power consumption of the first heater configured to heat the first waveguide is changed in order to change the phase to be provided by the first waveguide. Accordingly, this arrangement allows the overall heat amount applied to the substrate to be constant. By suppressing the change in the substrate temperature due to the change in the heat amount applied by the first heater, this arrangement is capable of preventing the occurrence of deformation such as warpage or the like in the substrate due to the difference in the thermal expansion rate between the substrate and the waveguide.

The one or more waveguides may include a second waveguide that differs from the first waveguide. The second heater may heat the second waveguide.

The one or more waveguides may include a second waveguide that differs from the first waveguide. The second heater may heat a position away from both the first waveguide and the second waveguide.

The one or more waveguides may be provided within a cladding layer on the substrate. The first heater and the second heater may be provided on the cladding layer. The phase modulator may further comprise a thermal insulation groove formed between the first heater and the second heater such that a side face of the cladding layer is exposed.

The phase modulator may further comprise an optical coupler provided on the substrate and coupled to the one or more waveguides. The optical coupler may be a Y-branch waveguide, a directional coupler, a multimode interference coupler, or a star coupler.

The plurality of heaters may be driven such that a change in electric power consumption of the first heater and the change in electric power consumption of the second heater cancel each other out.

Another embodiment of the present invention relates to a control method for a phase modulator. The phase modulator comprises: one or more waveguides provided on a substrate, and including at least a first waveguide; and a plurality of heaters provided on the substrate, and including a first heater that heats the first waveguide and a second heater that heats a position away from the first waveguide. The control method comprises controlling a phase of the first waveguide by changing an electric power consumption of the first heater under a condition that a total electric power consumption of the plurality of heaters is constant.

With this embodiment, the phase modulator is driven such that the electric power consumption of the plurality of heaters provided on the substrate is constant even if the electric power consumption of the first heater configured to heat the first waveguide is changed in order to change the phase to be provided by the first waveguide. Accordingly, this arrangement allows the overall heat amount applied to the substrate to be constant. By suppressing the change in the substrate temperature due to the change in the heat amount applied by the first heater, this arrangement is capable of preventing the occurrence of deformation such as warpage or the like in the substrate due to the difference in the thermal expansion rate between the substrate and the waveguide.

Yet another embodiment of the present invention relates to a fringe projector apparatus. The fringe projector apparatus comprises: a phase modulator having a first waveguide, a second waveguide, and a plurality of heaters including a first heater and a second heater, wherein the first and second waveguides and the plurality of heaters are provided on a single substrate, and wherein the first heater heats the first waveguide and the second heater heats a position away from the first waveguide; a light source that generates a light beam to be input to the first waveguide and the second waveguide; and a control unit that controls the phase difference between the first waveguide and the second waveguide by changing the electric power consumption of the first heater under a condition that the total electric power consumption of the multiple heaters is constant, so as to control an interference fringe projection pattern generated based on interference between light beams output from the first waveguide and the second waveguide.

With this embodiment, this arrangement is capable of maintaining the overall heat amount applied to the substrate, and of suppressing the occurrence of deformation such as warpage or the like in the substrate due to the difference in the thermal expansion rate between the substrate and the waveguide even if the heat amount applied by the first heater is changed in order to change the phase to be provided by the first waveguide. This arrangement is capable of suppressing the change in the output positions of the first waveguide and the second waveguide due to the change in shape of the substrate. This prevents the interference fringe projection pattern from changing due to causes other than the phase shifting of the first waveguide and the second waveguide. Accordingly, with the present embodiment, the interference fringe projection pattern can be controlled with higher precision.

Detailed description will be made with reference to the drawings regarding embodiments configured to provide the present invention. It should be noted that, in description with reference to the drawings, the same components are denoted by the same reference symbols, and redundant description thereof will be omitted as appropriate. The configurations will be described for exemplary purposes only, and are by no means intended to restrict the present invention.

Figure 1:
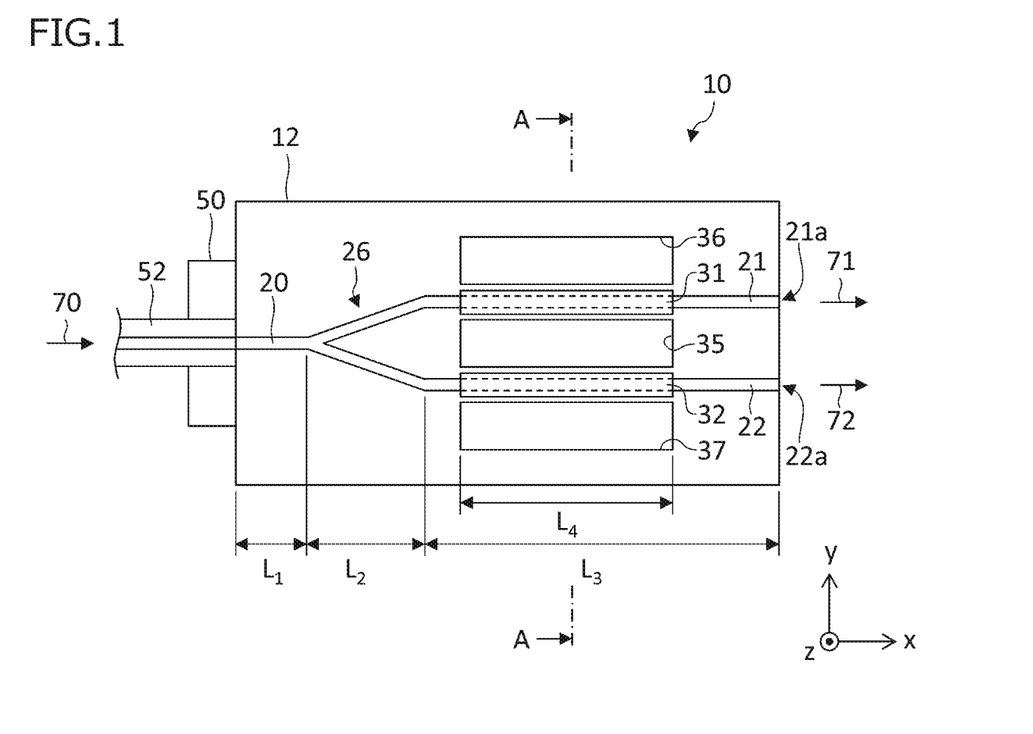
FIG. 1 is a top view showing a schematic configuration of a phase modulator according to an embodiment.

FIG. 1 is a top view showing a schematic configuration of a phase modulator 10 according to an embodiment. The phase modulator 10 has a Y-branch waveguide structure with a single input and two outputs. The phase modulator 10 splits an input light beam 70, phase modulates the light beams thus split, and outputs a first output light beam 71 and a second output light beam 72. The phase modulator 10 is configured as a so-called planar optical integrated circuit (PLC; Planar Lightwave Circuit). For example, a waveguide structure is formed using silica materials on a silicon substrate.

The phase modulator 10 comprises a substrate 12, an input waveguide 20, a first waveguide 21, a second waveguide 22, an optical coupler 26, a first heater 31, a second heater 32, a first thermal insulation groove 35, a second thermal insulation groove 36, and a third thermal insulation groove 37.

The input waveguide 20, the first waveguide 21, the second waveguide 22, and the optical coupler 26 are each configured as a waveguide structure formed on the substrate 12. The input waveguide 20 is coupled to the optical fiber 52 via a fiber block 50. The light beam input to the input waveguide 20 is split by the optical coupler 26 into the first waveguide 21 and the second waveguide 22. The first waveguide 21 is configured such that it extends linearly from the optical coupler 26 toward a first outlet 21a. The second waveguide 22 is configured such that it extends linearly from the optical coupler 26 toward a second outlet 22a.

In the example shown in the drawing, the first waveguide 21 and the second waveguide 22 are configured such that they extend linearly in the x direction, and away from each other in the y direction. That is to say, the first waveguide 21 and the second waveguide 22 are configured such that they extend in the x direction in parallel with each other. Furthermore, the input waveguide 20, the optical coupler 26, and the pair of the first waveguide 21 and the second waveguide 22 are sequentially arranged in the x direction. The input waveguide 20 has an x-direction length $L_1$ on the order of 0.5 mm. The optical coupler 26 has an x-direction length $L_2$ on the order of 1 mm. The first waveguide 21 and the second waveguide 22 are each configured to have a length $L_3$ on the order of 2.5 mm. The substrate 12 has a length on the order of 4 mm in the x direction. The first outlet opening 21a and the second outlet opening 22a are arranged with a distance between them on the order of 50 μm to 100 μm. The substrate 12 is configured to have a y-direction width on the order of 0.4 mm to 0.8 mm.

It should be noted that the input waveguide 20, the first waveguide 21, the second waveguide 22, and the optical coupler 26 are not restricted to such structures described in the drawing. Such components may each be configured to have other structures. In addition to the Y-branch waveguide structure, the optical coupler 26 may be configured as a directional optical coupler, a multi-mode interference coupler, or a star coupler. Also, the input waveguide 20, the first waveguide 21, and the second waveguide 22 are not necessarily configured to have a linear structure over the entire region. Also, the input waveguide 20, the first waveguide 21, and the second waveguide 22 may be configured as a structure having a curved portion.

The first heater 31 is provided on the first waveguide 21. The first heater 31 heats the first waveguide 21 so as to change the optical path length of the first waveguide 21 by means of the thermo-optic effect, thereby controlling the phase of the light beam that propagates through the first waveguide 21. The second heater 32 is provided on the second waveguide 22, and arranged at a position away from the first waveguide 21. The second heater 32 heats the second waveguide 22 so as to change the optical path length of the second waveguide 22 by means of the thermo-optic effect, thereby controlling the phase of the light beam that propagates through the second waveguide 22. The first heater 31 and the second heater 32 are each configured of a thin film that is capable of generating heat due to the passage of an electrical current. Examples of a thin-film material include metal materials such as nickel (Ni), chromium (Cr), and the like, metal oxide materials, metal nitride materials, etc.

The first heater 31 is configured such that it extends in the x direction along the first waveguide 21. The second heater 32 is configured such that it extends in the x direction along the second waveguide 22. The first heater 31 and the second heater 32 each have an x-direction length $L_4$ that is shorter than the length $L_3$ of the first waveguide 21 and the second waveguide 22. The length $L_4$ is on the order of 1.5 mm to 2.0 mm, for example. That is to say, the first heater 31 and the second heater 32 are configured to have the same length along the x direction and the same width along the y direction, so as to support the same heat amount and the same heating region with respect to electric power consumption. It should be noted that the first heater 31 and the second heater 32 may have different respective lengths or different respective widths. Also, there may be a difference in the heat amount or a heating region with respect to electric power consumption between the first heater 31 and the second heater 32.

The first thermal insulation groove 35 is provided between the first heater 31 and the second heater 32. The second thermal insulation groove 36 is provided at a position that is opposite to the first thermal insulation groove 35 across the first heater 31. The third thermal insulation groove 37 is provided at a position that is opposite to the first thermal insulation groove 35 across the second heater 32. Accordingly, the first thermal insulation groove 35 and the second thermal insulation groove 36 are arranged on both sides of the first heater 31 such that the first heater 31 is interposed between them. Furthermore, the first thermal insulation groove 35 and the third insulation groove 37 are arranged on both sides of the second heater 32 such that the second heater 32 is interposed between them.

The first thermal insulation groove 35, the second thermal insulation groove 36, and the third thermal insulation groove 37 are arranged such that they extend in the x direction along the first waveguide 21 or the second waveguide 22, and such that they have a length in the x direction that is on the order of those of the first heater 31 and the second heater 32. It should be noted that the first thermal insulation groove 35, the second thermal insulation groove 36, and the third thermal insulation groove 37 may each be configured to have a length that is longer than or otherwise shorter than that of the first heater 31 or the second heater 32. Also, the first thermal insulation groove 35, the second thermal insulation groove 36, and the third thermal insulation groove 37 may have the same length. Also, at least one from among the first thermal insulation groove 35, the second thermal insulation groove 36, and the third thermal insulation groove 37 may have a different length.

Figure 2:
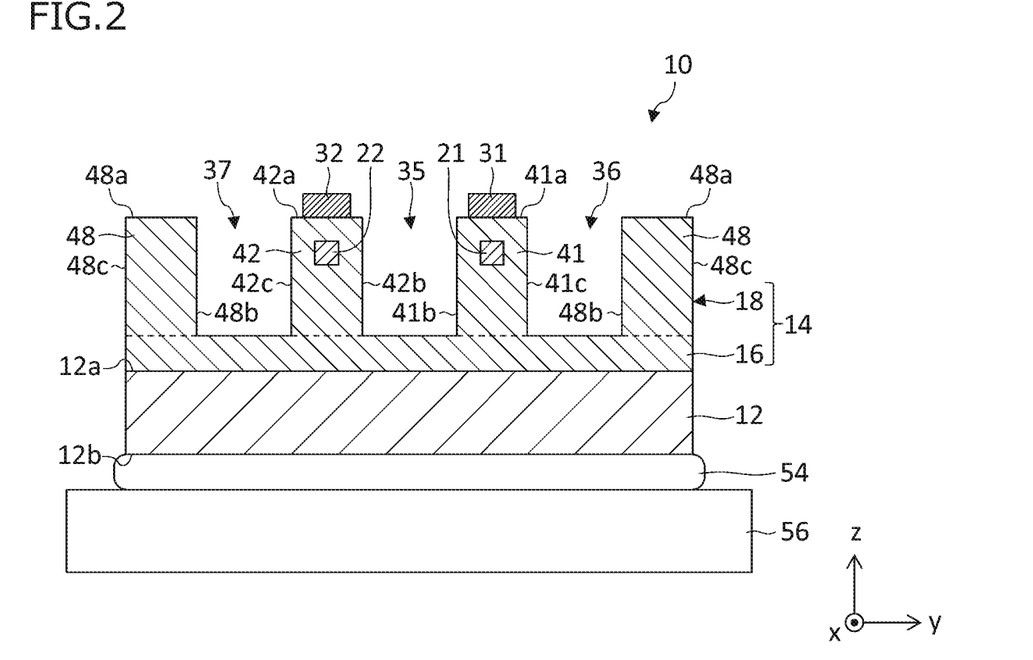
FIG. 2 is a cross-sectional diagram showing a schematic configuration of the phase modulator shown in FIG. 1.

FIG. 2 is a cross-sectional diagram showing a schematic configuration of the phase modulator shown in FIG. 1, which is taken along line A-A in FIG. 1. The phase modulator 10 includes a cladding layer 14 provided on the substrate 12. The substrate 12 is configured as a silicon wafer, for example. The cladding layer 14 is configured of a material including silicon oxide ($SiO_2$) as a main component. The substrate 12 is fixed to a carrier base 56 via an adhesive member 54.

The cladding layer 14 includes a lower cladding layer 16 provided on the substrate 12, and an upper cladding layer 18 provided on the lower cladding layer 16. The lower cladding layer 16 is provided so as to have a constant thickness over the entire region of an upper face 12a of the substrate 12. The upper cladding layer 18 is provided on only a part of the lower cladding layer 16 so as to avoid its overlapping the first thermal insulation groove 35, the second thermal insulation groove 36, and the third thermal insulation groove 37. In other words, a part of the upper cladding layer 18 is removed such that the side faces of the upper cladding layer 18 are exposed so as to form the first thermal insulation groove 35, the second thermal insulation groove 36, and the third thermal insulation groove 37. It should be noted that this arrangement does not require the lower cladding layer 16 to be provided. That is to say, the upper face 12a may be exposed at positions that match the first thermal insulation groove 35, the second thermal insulation groove 36, and the third thermal insulation groove 37.

The upper cladding layer 18 includes a first cladding portion 41, a second cladding portion 42, and an outer circumference cladding portion 48. The first cladding portion 41 is a cladding portion provided such that it surrounds the first waveguide 21. That is to say, a core portion that functions as the first waveguide 21 is provided within the first cladding portion 41. The first heater 31 is provided on an upper face 41a of the first cladding portion 41. The first cladding portion 41 has two side faces 41b and 41c such that one side face 41b is exposed to the first thermal insulation groove 35 and the other side face 41c is exposed to the second insulation groove 36.

The second cladding portion 42 is a cladding portion provided such that it surrounds the second waveguide 22. That is to say, a core portion that functions as the second waveguide 22 is provided within the second cladding portion 42. The second heater 32 is provided on an upper face 42a of the second cladding portion 42. The second cladding portion 42 has two side faces 42b and 42c such that one side face 42b is exposed to the first thermal insulation groove 35 and the other side face 42c is exposed to the third insulation groove 37.

The outer circumference cladding portion 48 is a cladding portion which is a part of the upper cladding layer 18, and which differs from the first cladding portion 41 and the second cladding portion 42. Neither the first waveguide 21 nor the second waveguide 22 is formed within the outer circumference cladding portion 48. No heater is provided on an upper face 48a of the outer circumference cladding portion 48. The outer circumference cladding portion 48 has an inner side face 48b and an outer side face 48c. The outer circumference cladding portion 48 is formed such that its inner faces 48b are exposed to the second thermal insulation groove 36 or the third thermal insulation groove 37.

The carrier base 56 is a member used to fixedly mount the phase modulator 10. The carrier base 56 is provided on the lower face 12b side of the substrate 12 that is opposite to the upper face 12a. The material of the carrier base 56 is not restricted in particular. At least one from among metal materials, resin materials, and ceramic materials may be employed. Examples of the substrates that can be employed as the carrier base 56 include a glass epoxy substrate, an aluminum (Al) substrate, and the like. An adhesive member 54 is provided between the substrate 12 and the carrier base 56. The material of the adhesive member 54 is not restricted in particular. At least one from among resin materials and metal materials may be employed. As the adhesive member 54, adhesive tape, an adhesive agent, silver (Ag) paste, solder, or the like may be employed.

Figure 3A:
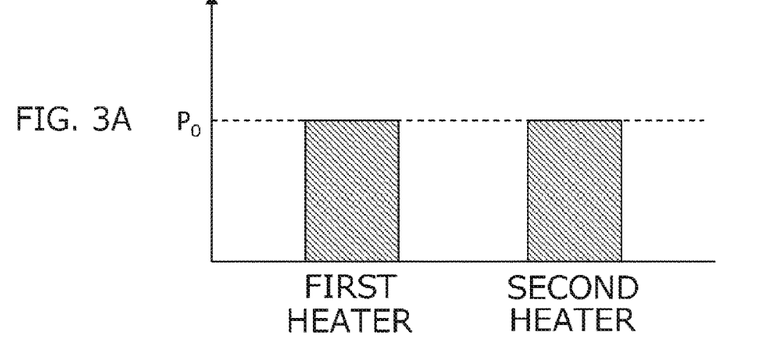
FIGS. 3A and 3B are schematic diagrams showing an operation of heaters.
Figure 3B:
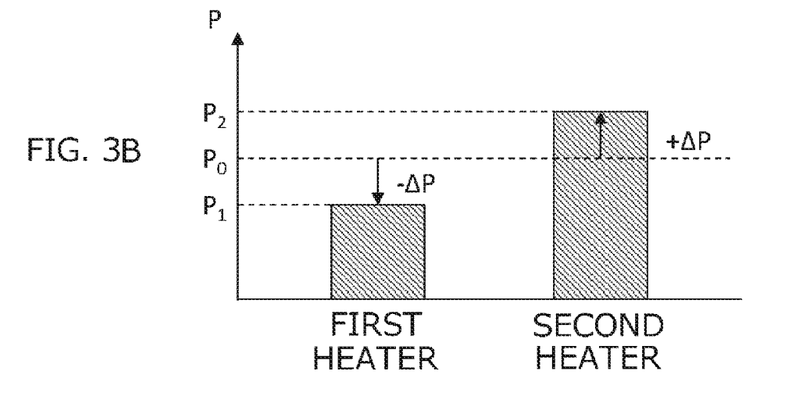

Next, description will be made regarding the operation of the phase modulator 10. FIGS. 3A and 3B are schematic diagrams each showing the operation of the heaters. The phase modulator 10 operates under a condition that the total electric power consumption of the first heater 31 and the second heater 32 is constant. This allows the overall heat amount of the phase modulator 10 to be constant. This prevents the temperature of the substrate 12 from changing even if the electric power consumption is changed for each heater.

FIG. 3A shows an example driven such that there is no phase difference between the first waveguide 21 and the second waveguide 22. In this case, electric power consumption of the first heater 31 and the second heater 32 are equalized so that temperatures of the first waveguide 21 and the second waveguide 22 match each other. For example, the phase modulator 10 is driven such that the electric power consumption $P_1$ of the first heater 31 and the electric power consumption $P_2$ of the second heater 32 are each the same as a reference electric power consumption $P_0$, i.e., $P_1=P_2=P_0$ and, the total electric power consumption is represented by $P_1+P_2=2P_0$.

FIG. 3B shows an example in which the phase modulator 10 is driven so as to provide a phase difference between the first waveguide 21 and the second waveguide 22. In this case, the electric power consumption of the first heater 31 is lowered and the electric power consumption of the second heater 32 is raised so as to provide a difference in the temperature between the first waveguide 21 and the second waveguide 22. Furthermore, the electric consumption is adjusted such the change in the electric power consumption of the first heater 31 ($-\Delta P$) and the change in the electric power consumption of the second heater 32 ($+\Delta P$) cancel each other out. That is to say, the phase modulator 10 is driven such that the relations $P_1=P_0-\Delta P$ and $P_2=P_0+\Delta P$ hold true. In this case, the total electric power consumption is represented by $P_1+P_2=2P_0$. It should be noted that the absolute value of the change in electric power consumption $|\Delta P|$ is set to be equal to or smaller than the average electric power consumption $P_0$ of each heater. This allows the overall heat amount applied to the phase modulator 10 to be constant, thereby allowing the temperature of the substrate 12 to be maintained at a constant temperature in the operation of the phase modulator 10.

It should be noted that the present invention is not restricted to such a driving operation example shown in the drawings. Other different control methods may be employed so as to control the first heater 31 and the second heater 32 under a condition that their total electric power consumption is constant. For example, in order to set the phase difference between the first waveguide 21 and the second waveguide 22 to zero, the first heater 31 and the second heater 32 may be controlled such that there is a difference in electric power consumption between the first heater 31 and the second heater 32, so as to eliminate the phase difference that occurs due to the size difference or the like between the first waveguide 21 and the second waveguide 22. Also, contrary to the example shown in FIG. 3B, an arrangement may be made in which the electric power consumption of the first heater 31 is raised and the electric power consumption of the second heater 32 is lowered so as to control the phase difference between the first waveguide 21 and the second waveguide 22.

With the present embodiment, by providing the phase modulator 10 with multiple heaters, this arrangement is capable of controlling the phases provided by the waveguides by changing the electric power consumption of any one of the heaters while maintaining the total electric power consumption of the multiple heaters. In a case in which only a single heater is provided to the phase modulator, this arrangement supports a phase control operation by changing the electric power consumption of the single heater. Accordingly, this leads to the overall change in temperature of the phase modulator according to the electric power consumption of the heater. In contrast, with the present embodiment, this arrangement is capable of operating the phase modulator 10 at a constant operation temperature by maintaining the total electric power consumption of the multiple heaters. This allows the phase modulator 10 to operate in a thermally stable state.

Furthermore, there is a difference in the thermal expansion rate between the substrate 12 and the cladding layer 14 of the phase modulator 10. Accordingly, if a temperature change occurs in the substrate 12, this leads to the occurrence of deformation such as warpage or the like in the substrate 12 due to the difference in the thermal expansion rate. Furthermore, it is conceivable for warpage to occur in the substrate 12 due to the difference in the thermal expansion rate between the substrate 12 and the adhesive member 54. If deformation has occurred in the substrate 12, this leads to a change in the positions of the first outlet 21a and the second outlet 22a. This involves a change in the state of the wavefront of the light beams output from the phase modulator 10. For example, in a case in which an interference fringe projection pattern is generated by providing interference between the first output light beam 71 and the second output light beam 72, this arrangement has the potential to cause a change in the projection pattern due to deformation of the substrate 12. Furthermore, it is conceivable for the deformation of the substrate 12 to lead to stress applied to the first waveguide 21 and the second waveguide 22, causing change in the phase difference between the first waveguide 21 and the second waveguide 22 due to the photo-elastic effect. In contrast, the present embodiment is capable of suppressing such warpage of the substrate due to the change in temperature, thereby suppressing the change in the projection pattern due to the change in shape of the substrate. This arrangement allows the state of the wavefronts of the light beams output from the phase modulator 10 to be controlled with higher precision.

With the present embodiment, the thermal insulation grooves are provided such that they extend along the first waveguide 21 and the second waveguide 22. Accordingly, this allows the first heater 31 to apply heat so as to support high-efficiency heating of the first waveguide 21. Furthermore, this allows the second heater 32 to apply heat so as to support high-efficiency heating of the second waveguide 22. This arrangement is capable of providing the amount of heat required to generate a desired phase difference using less electric power consumption.

Figure 4:
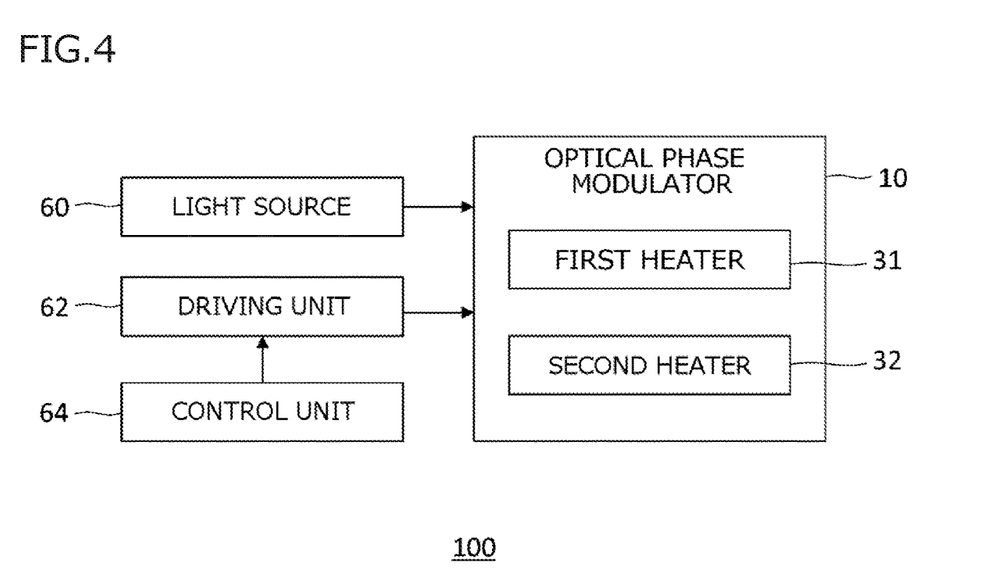
FIG. 4 is a diagram showing a schematic configuration of a fringe projector apparatus according to an embodiment.

FIG. 4 is a diagram showing a schematic configuration of an fringe projector apparatus 100 according to an embodiment, i.e., showing an application example of the phase modulator 10 described above. The fringe projector apparatus 100 includes the phase modulator 10, a light source 60, a driving unit 62, and a control unit 64. The fringe projector apparatus 100 is an apparatus configured to project an interference fringe pattern onto a target, which can be employed as an illumination apparatus for three-dimensional shape measurement of a target or a microscope.

The light source 60 is configured as a solid-state laser light source such as a semiconductor laser element or the like. The output wavelength of the light source 60 is not restricted in particular. For example, a red light beam having a wavelength $\lambda=635$ nm can be employed. The light source 60 may include a control mechanism that controls the driving current, operation temperature, etc., of the light-emitting element, so as to control the output light beam such that its output intensity and output wavelength are constant. The control mechanism may include a photoreceptor element and a driving element configured to support a feedback driving operation according to the output intensity of the light source 60 and a temperature adjustment element such as a Peltier element configured to control the temperature of the light source 60. By providing such a control mechanism, this arrangement is capable of stabilizing the output wavelength of the light source 60, and of suppressing change in the bright and dark periods of the generated interference fringe pattern.

The driving unit 62 drives the first heater 31 and the second heater 32 of the phase modulator 10. The driving unit 62 is configured as a DC power supply that supports a variable output voltage according to an instruction value received from the control unit 64. The control unit 64 controls the output voltage of the driving unit 62 so as to control the electric power consumption of each of the first heater 31 and the second heater 32. The control unit 64 changes the electric power consumption of each of the first heater 31 and the second heater 32 under a condition that the total electric power consumption of the first heater 31 and the second heater 32 is constant, so as to control the phase difference between the first waveguide 21 and the second waveguide 22. The control unit 64 may hold correlation information such as a relation expression, table, or the like, that represents the correlation between the value of the phase difference between the first waveguide 21 and the second waveguide 22 and the electric power consumption of the first heater 31 and the second heater 32, and may control the output voltage of the driving unit 62 based on the correlation information thus held.

The light beam output from the light source 60 is input to the input waveguide 20 of the phase modulator 10. After the input light beam is split and subjected to phase modulation by means of the phase modulator 10, the light beams thus split and subjected to phase modulation are output via the first outlet 21a and the second outlet 22a of the phase modulator 10. The fringe projector apparatus 100 generates interference between the pair of light beams output from the phase modulator 10, so as to generate an interference fringe pattern. The control unit 64 controls the output voltage of the driving unit 62 so as to control the amounts of heat to be generated by the first heater 31 and the second heater 32, so as to control the phase difference between the first waveguide 21 and the second waveguide 22. The control unit 64 changes the phase difference between the first waveguide 21 and the second waveguide 22, so as to change the interference fringe projection pattern. For example, the control unit 64 changes the bright positions and the dark positions of the interference fringe pattern thus generated, thereby scanning the interference fringe pattern. The fringe projector apparatus 100 controls the phase difference between the first waveguide 21 and the second waveguide 22, thereby allowing the scanning amount of the interference fringe pattern thus projected to be controlled.

The fringe projector apparatus 100 may be employed as a projector apparatus that projects an interference fringe pattern, so as to support a three-dimensional measurement method, which is a so-called "fringe scanning method". With the fringe scanning method, multiple interference fringe patterns having different phase differences applied by the phase modulator 10 are projected onto a target so as to capture the images of the target. By analyzing multiple projected images that correspond to the respective interference fringe patterns, this arrangement is capable of calculating the three-dimensional shape of the target. With the fringe scanning method, by controlling the bright and dark positions of the interference fringe patterns with high precision, this arrangement provides three-dimensional shape measurement with improved measurement precision. With the fringe projector apparatus 100 according to the present embodiment, this arrangement is capable of suppressing a change in the interference fringe pattern that occurs due to a change in the temperature of the phase modulator 10 and a change in the shape of the substrate. This allows the bright and dark positions of the interference fringe pattern to be more strictly controlled based on the phase difference generated by the phase modulator 10. Accordingly, by applying the fringe projector apparatus 100 according to the present embodiment to the fringe scanning method, this arrangement provides three-dimensional shape measurement using the fringe scanning method with improved measurement precision.

The fringe projector apparatus 100 may be applied to a microscope using a so-called "structured illumination method". The structured illumination method is a microscope technique. In this technique, by employing illumination light having a pattern such as a striped pattern, moire pattern, or the like, this arrangement provides high resolution as compared with optical microscopes employing uniform illumination light. With the present embodiment, this arrangement allows the interference fringe pattern generated by the fringe projector apparatus 100 to be controlled with higher precision, thereby providing such a structured illumination microscope with improved resolution. In addition, the fringe projector apparatus 100 may be applied to structured illumination to be used to measure optical characteristics of a target, such as reflection, scattering, or the like.

Modification 1

Figure 5:
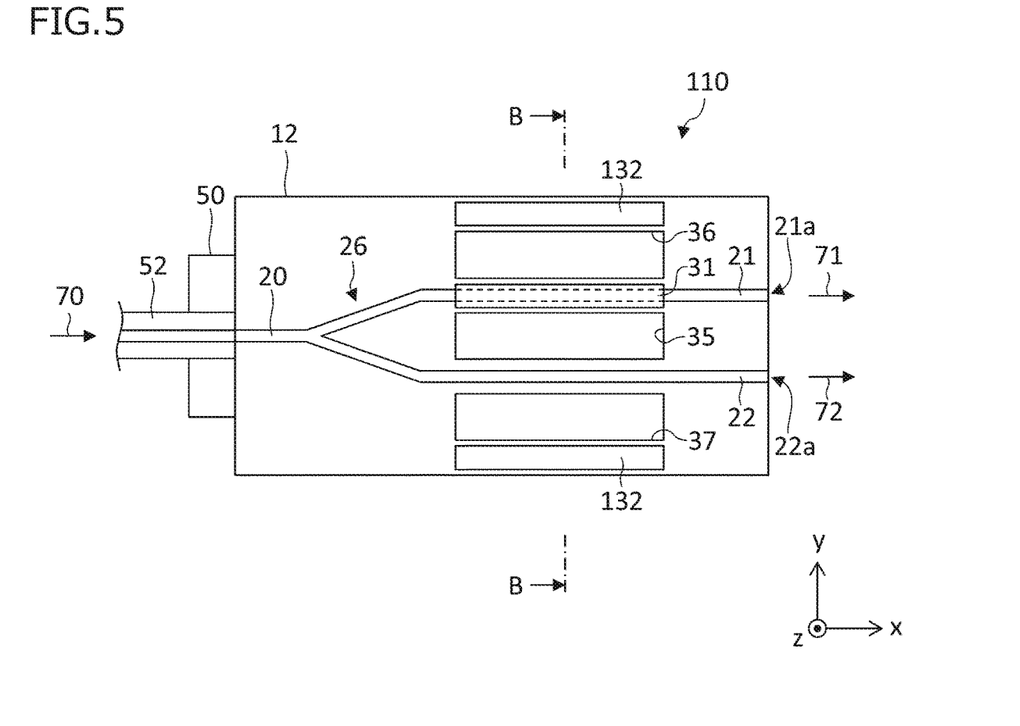
FIG. 5 is a top view showing a schematic configuration of the phase modulator according to a modification.
Figure 6:
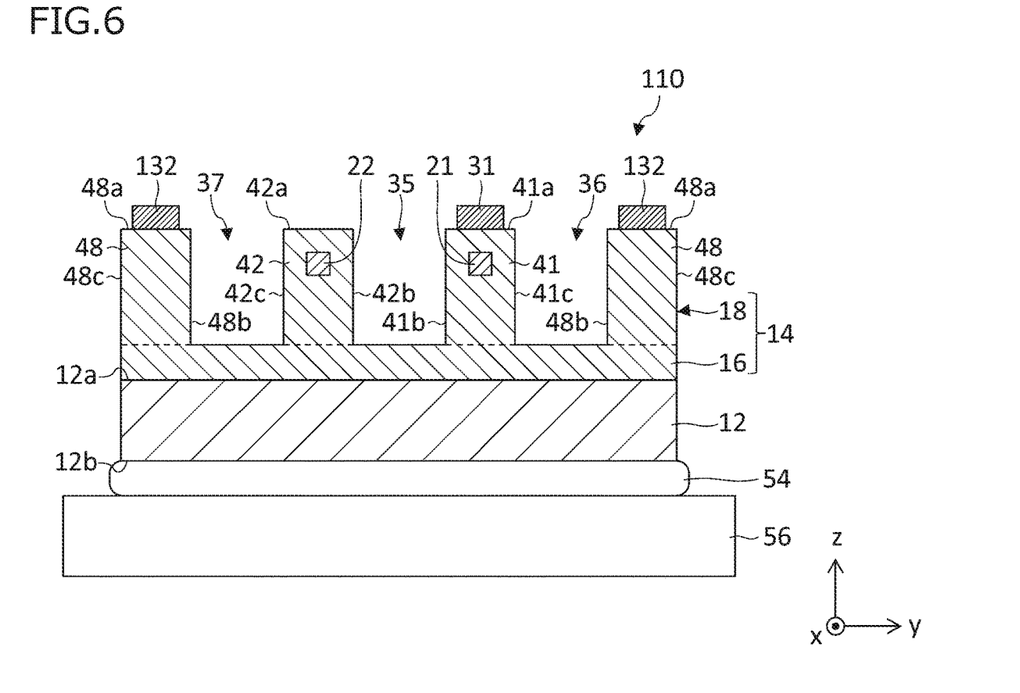
FIG. 6 is a cross-sectional diagram showing a schematic configuration of the phase modulator shown in FIG. 5.

FIG. 5 is a top view showing a schematic configuration of a phase modulator 110 according to a modification. FIG. 6 is a cross-sectional diagram showing the schematic configuration of the phase modulator 110 shown in FIG. 5, which is taken along line B-B shown in FIG. 5. In the present modification, the second heater 132 is provided at a position away from both the first waveguide 21 and the second waveguide 22, unlike the above-described embodiment in which the second heater 132 is provided on the second waveguide 22. Description will be made regarding the present modification directing attention to the points of difference from the above-described embodiment.

The phase modulator 110 includes a substrate 12, an input waveguide 20, a first waveguide 21, a second waveguide 22, an optical coupler 26, a first heater 31, a second heater 132, a first thermal insulation groove 35, a second thermal insulation groove 36, and a third thermal insulation groove 37. The phase modulator 110 includes a cladding layer 14 provided on the substrate 12. The second heater 132 is not provided on the second cladding portion 42 on which the second waveguide 22 is provided. Instead, the second heater 132 is provided on an upper face 48a of an outer circumference cladding portion 48. Accordingly, the heater 132 heats a position that differs from the first waveguide 21 and the second waveguide 22. Specifically, the second heater 132 heats the outer circumference cladding portion 48.

With the present modification, the first heater 31 and the second heater 132 are also driven such that their total electric power consumption is constant. Specifically, by changing the electric power consumption of the first heater 31, this arrangement changes the heat amount to be applied to the first waveguide 21, so as to control the phase to be provided by the first waveguide 21. Furthermore, the electric power consumption of the second heater 132 is changed so as to cancel out the change in the electric power consumption of the first heater 31, thereby maintaining the overall heat amount applied to the phase modulator 110. This suppresses change in the temperature of the substrate 12. Accordingly, the present modification provides the same effects as those provided by the above-described embodiment.

Description has been made with reference to the drawing regarding an example in which the second heaters 132 are arranged on both sides such that the first waveguide 21 and the second waveguide 22 are interposed between them. Also, a single second heater 132 may be arranged on one from among the two sides. Instead of the second heaters 132 arranged such that they extend in the x direction, the multiple second heaters 132 may be arranged in a dispersed manner such that they overlap neither the first waveguide 21 nor the second waveguide 22. For example, the second heaters 132 may be arranged at each of four corners of the cladding layer 14.

Modification 2

Figure 7:
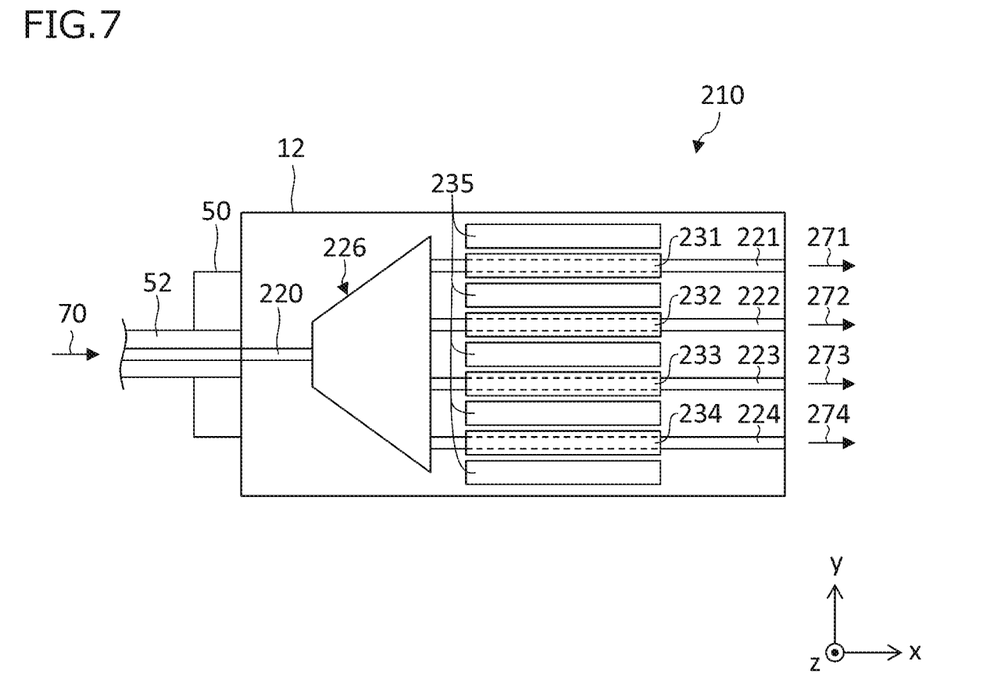
FIG. 7 is a top view showing a schematic configuration of a phase modulator according to a modification.

FIG. 7 is a top view showing a schematic configuration of a phase modulator 210 according to a modification. The point of difference between the present modification and the above-described embodiment is that, in the present modification, a waveguide structure having a single input and four outputs is formed on the substrate 12. Description will be made regarding the present modification directing attention to the points of difference from the above-described embodiment.

The phase modulator 210 includes a substrate 12, an input waveguide 220, a first waveguide 221, a second waveguide 222, a third waveguide 223, a fourth waveguide 224, an optical coupler 226, a first heater 231, a second heater 232, a fourth heater 234, and multiple thermal insulation grooves 235.

The input waveguide 220 is coupled to the optical fiber 52 via the fiber block 50. For example, the input waveguide 220 receives the input light beam 70 emitted from the light source 60. The optical coupler 226 is configured as a so-called star coupler, which splits the light beam received from the input waveguide 220 into the first waveguide 221, the second waveguide 222, the third waveguide 223, and the fourth waveguide 224. The first waveguide 221, the second waveguide 222, the third waveguide 223, and the fourth waveguide 224 are arranged such that they extend from the optical coupler 226 in the x direction.

The first heater 231 is provided on the first waveguide 221, and selectively heats the first waveguide 221 so as to control the phase provided by the first waveguide 221. The second heater 232 is provided on the second waveguide 222, and selectively heats the second waveguide 222 so as to control the phase provided by the second waveguide 222. The third heater 233 is provided on the third waveguide 223, and selectively heats the third waveguide 223 so as to control the phase provided by the third waveguide 223. The fourth heater 234 is provided on the fourth waveguide 224, and selectively heats the fourth waveguide 224 so as to control the phase provided by the fourth waveguide 224. The thermal insulation grooves 235 are provided on both sides such that the heaters 231, 232, 233, and 234 are interposed between them.

In the present modification, in the same way as described above, the electric power consumption of each heater is controlled under a condition that the total electric power consumption of the multiple heaters 231 through 234 is constant. With the present modification, by employing four heaters, this arrangement is capable of independently controlling the phase difference $\delta_1$ provided by the first waveguide 221, the phase difference $\delta_2$ provided by the second waveguide 222, and the phase difference $\delta_3$ provided by the third waveguide 223 with the phase provided by the fourth waveguide 224 as a reference phase while maintaining the total electric power consumption at a constant level, for example. The heat amount to be provided by each heater can be calculated by solving a system of equations based on the three phase differences $\delta_1$, $\delta_2$, and $\delta_3$.

The light beam that has been phase modulated by the first waveguide 221 is output as the first output light beam 271. Similarly, the light beam that has been phase modulated by the second waveguide 222 is output as the second output light beam 272. The light beam that has been phase modulated by the third waveguide 223 is output as the third output light beam 273. The light beam that has been phase modulated by the fourth waveguide 224 is output as the fourth output light beam 274. The four output light beams output from the phase modulator 210 are subjected to multiple beam interference so as to generate an interference pattern. With the present modification, this arrangement is capable of suppressing change in the temperature of the phase modulator 210, thereby allowing the phase provided by each waveguide to be controlled with high precision. This allows the shape of the interference pattern thus generated to be controlled more strictly.

Description has been made in the present modification regarding an arrangement in which the waveguide structure has a single input and four outputs. However, the number of outputs of the waveguide structure is not restricted in particular. Rather, the number of outputs may be designed as desired. Also, in another modification, the waveguide structure may have a single input and three outputs, or may have a single input and eight outputs.

Modification 3

Figure 8:
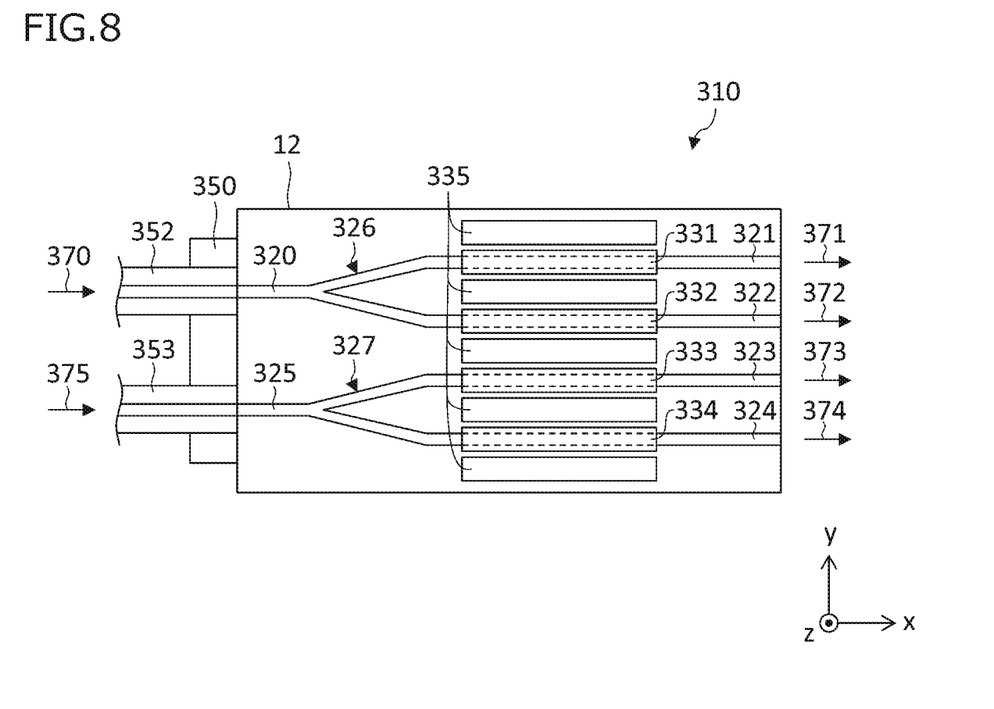
FIG. 8 is a top view showing a schematic configuration of a phase modulator according to a modification.

FIG. 8 is a top view showing a schematic configuration of a phase modulator 310 according to a modification. The point of difference between the present modification and the above-described embodiment is that, in the present modification, two waveguide structures having a single input and two outputs are provided on a single substrate 12. Description will be made directing attention to the points of difference from the above-described embodiment.

The phase modulator 310 includes a substrate 12, a first input path 320, a second input path 325, a first waveguide 321, a second waveguide 322, a third waveguide 323, a fourth waveguide 324, a first optical coupler 326, a second optical coupler 327, a first heater 331, a second heater 332, a third heater 333, a fourth heater 334, and multiple thermal insulation grooves 335.

The first input path 320 is coupled to the first optical fiber 352 via the fiber block 350. The light beam input to the first input path 320 is split by means of the first optical fiber 326 into the first waveguide 321 and the second waveguide 322. The second input path 325 is coupled to the second optical fiber 353 via the fiber block 350. The light beam input to the second input path 325 is split by means of the optical coupler 327 into the third waveguide 323 and the fourth waveguide 324. The corresponding heaters 331, 332, 333, and 334 are provided on the first waveguide 321, the second waveguide 322, the third waveguide 323, and the fourth waveguide 324, respectively. The thermal insulation grooves 335 are provided on both sides of each of the heaters 331 through 334 such that each heater is interposed between the thermal insulation grooves 335.

After the first input light beam 370 input to the first input path 320 is split by the first optical coupler 326, the light beams thus split are phase modulated, and are output as the first output light beam 371 and the second output light beam 372. The first output light beam 371 and the second output light beam 372 are subjected to two-beam interference so as to generate an interference fringe pattern. Furthermore, after the second input light beam 375 input to the second input path 325 is split by the second optical coupler 327, the light beams thus split are phase modulated, and are output as the third output light beam 373 and the fourth output light beam 374. The third output light beam 373 and the fourth output light beam 374 are subjected to two-beam interference so as to generate an interference fringe pattern.

There is a difference between the first input light beam 370 and the second input light beam 375 in at least one optical characteristic such as the wavelength, intensity, phase, or the like. In a case in which the first input light beam 370 and the second input light beam 375 are input to the phase modulator 310 at the same time, this arrangement is capable of superimposing an interference fringe pattern based on the first input light beam 370 and an interference fringe pattern based on the second input light beam 375, and of outputting the superimposed light beam. For example, by designing the first input light beam 370 and the second input light beam 375 to have different wavelengths, this arrangement is capable of superimposing the two interference fringe patterns designed with different bright-and-dark pitches, thereby allowing a moire pattern to be generated. It should be noted that each of the first input light beam 370 and the second input light beam 375 may be input independently. Such an arrangement may generate an interference fringe pattern based on one from among the two input light beams.

In the present modification, by driving each heater such that the total electric power consumption of the multiple heaters is constant in the same way as described above, this arrangement is capable of controlling the generated interference fringe pattern or moire pattern with higher precision.

Description has been made above regarding the present invention with reference to the examples. The above-described examples have been described for exemplary purposes only, and are by no means intended to be interpreted restrictively. Rather, it can be readily conceived by those skilled in this art that various modifications may be made by making various combinations of the aforementioned components or processes, which are also encompassed in the technical scope of the present invention.

Description has been made in the above-described embodiments and modifications regarding an arrangement in which, in order to provide the waveguides with improved heating efficiency, the thermal insulation grooves are provided on both sides such that each heater is interposed between them. In another modification, an arrangement may be made in which such thermal insulation grooves may be provided to a part of the heaters. Also, such thermal insulation grooves may be omitted. For example, such a thermal insulation groove may be provided only between adjacent heaters.

Description has been made in the above-described embodiments and modifications regarding a waveguide structure configured to split an input light beam into multiple light beams, and including heaters provided to the branched waveguides. In yet another modification, multiple heaters may be provided to a linear waveguide structure having a single input and a single output, and may be driven such that the total electric power consumption of the multiple heaters is constant. In this case, the first heater is provided on the waveguide, and the second heater is provided at a position away from the waveguide. In this modification, by employing the multiple heaters in the same way as described above, this arrangement supports phase modulation using the thermo-optic effect while suppressing change in the temperature over the entire area of the waveguide structure.

In yet another modification, the above-described technique may be applied to an optical switch employing a Mach-Zehnder interferometer. In this case, in the Mach-Zehnder interferometer, the first heater may be arranged on the first waveguide, and the second heater may be arranged on the second waveguide. Also, in the Mach-Zehnder interferometer, the first heater may be arranged on the first waveguide, and the second heater may be arranged at a position away from both the first waveguide and the second waveguide. The present modification supports a higher-precision phase control operation, thereby providing the optical switch with an improved on/off ratio.

What is claimed is:

1. A fringe projector apparatus comprising:
    a phase modulator having a first waveguide, a second waveguide, a first outlet opening of the first waveguide, a second outlet opening of the second waveguide, and a plurality of heaters including a first heater and a second heater, wherein the first and second waveguides and the plurality of heaters are provided on a single substrate, wherein the first heater heats the first waveguide and the second heater heats a position away from the first waveguide, and wherein the phase modulator is configured to generate an interference fringe based on interference between light beams output from the first outlet opening and the second outlet opening;
    a light source that generates a light beam to be input to the first waveguide and the second waveguide; and
    a controller that controls a phase difference between the first waveguide and the second waveguide by changing an electric power consumption of the first heater under a condition that a total electric power consumption of the plurality of heaters is constant, so as to control the interference fringe.

2. The fringe projector apparatus according to claim 1, wherein the second heater heats the second waveguide.

3. The fringe projector apparatus according to claim 1, wherein the second heater heats a position away from both the first waveguide and the second waveguide.

4. The fringe projector apparatus according to claim 1, wherein the first and second waveguides are provided within a cladding layer on the substrate,
    wherein the first heater and the second heater are provided on the cladding layer, and
    wherein the phase modulator further comprises a thermal insulation groove formed between the first heater and the second heater such that a side face of the cladding layer is exposed.

5. The fringe projector apparatus according to claim 1, wherein the phase modulator further comprises an optical coupler provided on the substrate and coupled between the light source and the first and second waveguides, and
    wherein the optical coupler comprises one of a Y-branch waveguide, a directional coupler, a multimode interference coupler, and a star coupler.

6. The fringe projector apparatus according to claim 1, wherein the controller drives the plurality of heaters such that a change in electric power consumption of the first heater and a change in electric power consumption of the second heater cancel each other out.

7. The fringe projector apparatus according to claim 1, wherein the first waveguide extends linearly to the first outlet opening and the second waveguide extends linearly to the second outlet opening.

8. The fringe projector apparatus according to claim 1, wherein no coupler is provided between the first and second waveguides and the first and second outlet openings.

9. A control method for a fringe projector apparatus, the method comprising:
    controlling an interference fringe projection pattern generated based on interference between light beams output from a first outlet opening of a first waveguide and a second outlet opening of a second waveguide,
    wherein a phase difference between the first waveguide and the second waveguide is controlled, under a condition that a total electric power consumption of a plurality of heaters including a first heater that heats the first waveguide and a second heater that heats a position away from the first waveguide is constant, by changing an electric power consumption of the first heater.

* * * * *